US012436115B2

(12) United States Patent
Vukotic et al.

(10) Patent No.: US 12,436,115 B2
(45) Date of Patent: Oct. 7, 2025

(54) TRANSMISSION X-RAY DIFFRACTION APPARATUS AND RELATED METHOD

(71) Applicant: PROTO PATENTS LTD., LaSalle (CA)

(72) Inventors: Vedran Nicholas Vukotic, LaSalle (CA); Stanislav Veinberg, LaSalle (CA); Alec Iskra, LaSalle (CA); Mohammed Belassel, LaSalle (CA); Matt Williams, LaSalle (CA); Maxime Le Ster, LaSalle (CA); Anton Dmitrienko, LaSalle (CA); Michael Brauss, LaSalle (CA)

(73) Assignee: PROTO PATENTS LTD., LaSalle (CA)

( * ) Notice: Subject to any disclaimer, the term of this patent is extended or adjusted under 35 U.S.C. 154(b) by 306 days.

(21) Appl. No.: 18/175,121

(22) Filed: Feb. 27, 2023

(65) Prior Publication Data

US 2023/0273134 A1 Aug. 31, 2023

Related U.S. Application Data

(60) Provisional application No. 63/268,497, filed on Feb. 25, 2022.

(51) Int. Cl.
*G01N 23/20008* (2018.01)
*G01N 23/20016* (2018.01)
(Continued)

(52) U.S. Cl.
CPC . *G01N 23/20008* (2013.01); *G01N 23/20016* (2013.01); *G01N 23/20033* (2013.01);
(Continued)

(58) Field of Classification Search
CPC ....... G01N 23/20008; G01N 23/20016; G01N 23/20033; G01N 23/201; G01N 23/205;
(Continued)

(56) References Cited

U.S. PATENT DOCUMENTS 5,359,640 A 10/1994 Fink et al.
6,014,423 A * 1/2000 Gutman ................ B82Y 10/00 378/85

(Continued)

FOREIGN PATENT DOCUMENTS

CN 103134825 B * 10/2014
EP 2455747 B1 5/2012

(Continued)

*Primary Examiner* — Thomas R Artman

(74) *Attorney, Agent, or Firm* — Meunier Carlin & Curfman LLC

(57) ABSTRACT

There is provided a transmission X-ray diffraction (XRD) apparatus, the transmission XRD apparatus including an X-ray source for generating a direct X-ray beam; sample holder for receiving the sample, the sample being positioned to receive the direct X-ray beam when held by the sample holder; a detector for receiving X-rays transmitted through the sample and outputting an X-ray diffraction pattern therefrom; and an optical element positioned between the X-ray source and the detector, the optical element including a Montel optic and a secondary pin-hole collimator collectively adapted to focus the direct X-ray beam on the detector, wherein a ratio between a dimension of the direct X-ray beam projected on the detector and a sample-to-detector distance is equal or smaller than 1/570. Related methods are also provided.

22 Claims, 18 Drawing Sheets

(51) Int. Cl.
*G01N 23/20033* (2018.01)
*G01N 23/201* (2018.01)
*G01N 23/205* (2018.01)
*G01N 23/207* (2018.01)

(52) U.S. Cl.
CPC ......... *G01N 23/201* (2013.01); *G01N 23/205* (2013.01); *G01N 23/207* (2013.01); *G01N 2223/03* (2013.01); *G01N 2223/054* (2013.01); *G01N 2223/0561* (2013.01); *G01N 2223/1016* (2013.01); *G01N 2223/307* (2013.01); *G01N 2223/31* (2013.01); *G01N 2223/315* (2013.01); *G01N 2223/316* (2013.01); *G01N 2223/323* (2013.01); *G01N 2223/331* (2013.01); *G01N 2223/50* (2013.01); *G01N 2223/64* (2013.01)

(58) Field of Classification Search
CPC ............. G01N 23/207; G01N 2223/03; G01N 2223/054; G01N 2223/0561; G01N 2223/1016; G01N 2223/307; G01N 2223/31; G01N 2223/315; G01N 2223/316; G01N 2223/323; G01N 2223/331; G01N 2223/50; G01N 2223/64
See application file for complete search history.

(56) References Cited

U.S. PATENT DOCUMENTS 6,041,099 A * 3/2000 Gutman ................... G21K 1/06 378/85
6,330,301 B1 * 12/2001 Jiang .................... G01N 23/201 378/85
6,993,113 B2 * 1/2006 Hoshino .............. G01N 23/201 378/70
7,139,366 B1 * 11/2006 Jiang ........................ G21K 1/04 378/86
7,400,705 B2 * 7/2008 Hoshino .............. G01N 23/207 378/80
7,734,011 B2 * 6/2010 Jiang ................ G01N 23/20008 378/86
8,094,780 B2 * 1/2012 Jiang ........................ G21K 1/04 378/86
9,014,335 B2 * 4/2015 Jiang .................... G01N 23/207 378/87
9,031,203 B2 * 5/2015 Jiang .................... G01N 23/207 378/147
9,383,324 B2 * 7/2016 Feser ................... G01N 23/046
11,796,485 B2 * 10/2023 Hoghoj ................ G01N 23/201
2004/0008815 A1 * 1/2004 Hoshino .............. G01N 23/201 378/86
2004/0008816 A1 * 1/2004 Hoshino .............. G01N 23/201 378/86
2006/0269045 A1 * 11/2006 Jiang .................... G01N 23/207 378/86
2008/0069302 A1 * 3/2008 Jiang .................... G01N 23/207 378/86
2009/0299642 A1 * 12/2009 French ............... G01N 23/2055 702/19
2010/0284516 A1 * 11/2010 Jiang ................ G01N 23/20008 378/86
2013/0329858 A1 * 12/2013 Jiang .................... G01N 23/201 378/87
2013/0329861 A1 * 12/2013 Jiang .................... G01N 23/201 378/147
2014/0112433 A1 * 4/2014 Feser ................... G01N 23/207 378/21
2022/0326166 A1 * 10/2022 Hoghoj .................... G21K 1/06
2023/0273134 A1 * 8/2023 Vukotic ............... G01N 23/205 378/70
2024/0248050 A1 * 7/2024 Hoghoj ................ G01N 23/201

FOREIGN PATENT DOCUMENTS

JP 3883060 B2 * 2/2007 ............. G01N 23/20
WO 2003/081221 A2 10/2003
WO 2013/005180 A1 1/2013

* cited by examiner tanθ ≈ 1/570 ≈ 0.10°
Size of X-ray Beam on Detector (FWHM) ≈ 1
Sample to Detector Distance ≥ 570
FIGURE 17
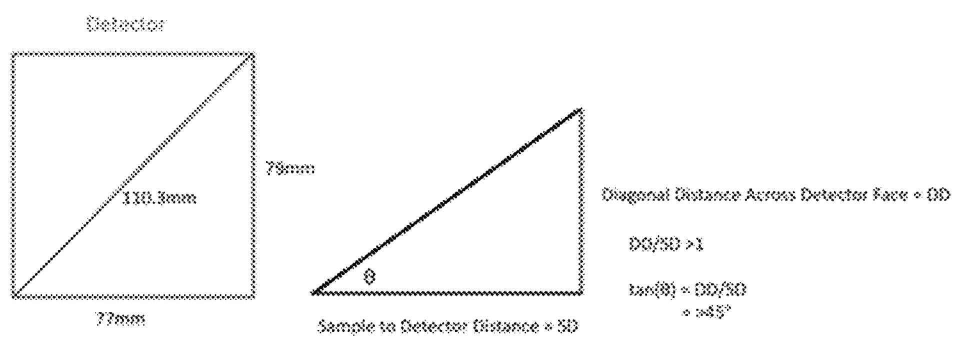
FIGURE 18
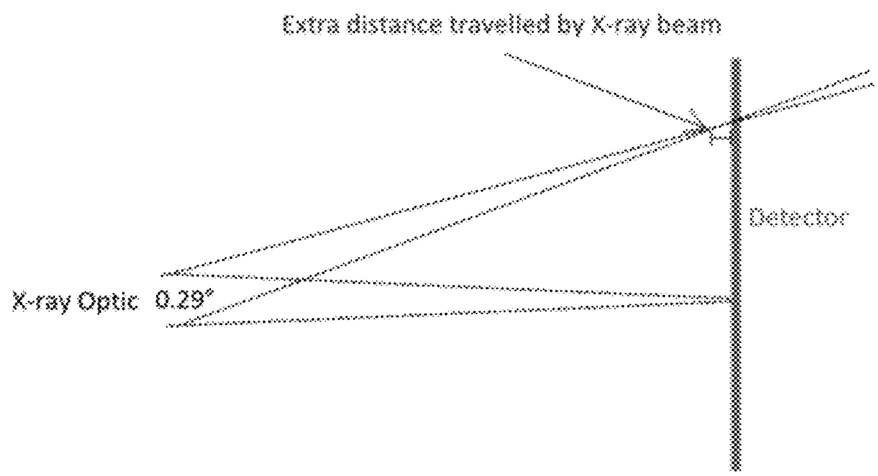
FIGURE 19

TRANSMISSION X-RAY DIFFRACTION APPARATUS AND RELATED METHOD

CROSS-REFERENCE TO RELATED APPLICATIONS

This application claims the benefit of priority to U.S. Provisional Application No. 63/268,497, filed Feb. 25, 2022, which is hereby incorporated herein by reference in its entirety.

TECHNICAL FIELD

The technical field generally relates to the field of X-ray diffraction techniques. More particularly, it relates to a transmission X-ray diffraction apparatus and related methods.

BACKGROUND

X-ray diffraction (XRD) apparatuses configured in a transmission geometry are known in the art. Examples of such apparatuses are presented in EP 2455747, WO2003/081221 and WO 2013/005180.

However, existing solutions are associated with numerous drawbacks, notably in terms of reliability, precision, and efficiency.

Challenges still exist in the field of XRD apparatus operated in a transmission mode, as well as related methods.

SUMMARY

In accordance with an aspect, there is provided a transmission X-ray diffraction (XRD) apparatus, the transmission XRD apparatus including:

- an X-ray source for generating a direct X-ray beam;
- a sample holder for receiving the sample, the sample being positioned to receive the direct X-ray beam when held by the sample holder;
- a detector for receiving X-rays transmitted through the sample and outputting an X-ray diffraction pattern therefrom; and
- an optical element positioned between the X-ray source and the detector, the optical element including a Montel optic and a secondary pin-hole collimator collectively adapted to focus the direct X-ray beam on the detector, wherein a ratio between a dimension of the direct X-ray beam projected on the detector and a sample-to-detector distance is equal or smaller than 1/570.

In accordance with another aspect, there is provided a method for characterizing a sample, the method including:

- generating a direct X-ray beam with an X-ray source, the direct X-ray beam being transmitted through the sample before being collected by a detector;
- conditioning the direct X-ray beam with an optical element positioned between the X-ray source and the detector, the optical element including a Montel optic and a secondary pin-hole collimator collectively adapted to focus the direct X-ray beam on the detector, wherein a ratio between a dimension of the direct X-ray beam projected on the detector and a sample-to-detector distance is equal or smaller than 1/570; and
- outputting an X-ray diffraction pattern.

In accordance with another aspect, there is provided a transmission X-ray diffraction (XRD) apparatus, the transmission XRD apparatus including:

- an X-ray source for irradiating a sample with an X-ray beam;
- a detector for receiving X-rays transmitted through the sample and outputting an X-ray diffraction pattern therefrom;
- an optical element positioned between the X-ray source and the detector, the optical element including a Montel optic and a secondary pin-hole collimator collectively adapted to focus the X-ray beam on the detector; and
- a motorized stage, including:
  - a base;
  - a goniometer head supported by the base;
  - a sample holder for receiving the sample, the sample holder being mounted to the goniometer head, such that the sample is positioned to receive the X-ray beam when held by the sample holder; and
  - a motor assembly in driving engagement with the goniometer head, the motor assembly being configured to impart a relative movement to the sample with respect to the X-ray source and the detector.

In accordance with another aspect, there is provided a method for characterizing a sample, the method including:

- generating an X-ray beam with an X-ray source, the X-ray beam being transmitted through the sample before being collected by a detector;
- providing a relative movement to the sample with respect to the X-ray source and the detector with a motorized stage, the motorized stage including:
  - a base;
  - a goniometer head supported by the base;
  - a sample holder for receiving the sample, the sample holder being mounted to the goniometer head, such that the sample is positioned to receive the X-ray beam when held by the sample holder; and
  - a motor assembly in driving engagement with the goniometer head, the motor assembly being configured to impart the relative movement to the sample with respect to the X-ray source and the detector;
- conditioning the X-ray beam with an optical element positioned between the X-ray source and the detector, the optical element including a Montel optic and a secondary pin-hole collimator; and
- outputting an X-ray diffraction pattern.

In accordance with another aspect, there is provided a transmission X-ray diffraction (XRD) apparatus, the transmission XRD apparatus comprising:

- an X-ray source for irradiating a sample with an X-ray beam;
- a detector for receiving X-rays transmitted through the sample and outputting an X-ray diffraction pattern therefrom;
- an optical element positioned between the X-ray source and the detector, the optical element comprising a Montel optic and a secondary pin-hole collimator collectively adapted to focus the X-ray beam on the detector; and
- a motorized stage, comprising:
  - a base;
  - a sample holder for receiving the sample, the sample holder being mounted to the base, such that the sample is positioned to receive the X-ray beam when held by the sample holder; and
  - a motor assembly in driving engagement with the sample holder, the motor assembly being configured to impart a relative movement to the sample with respect to the X-ray source and the detector.

In accordance with another aspect, there is provided a transmission X-ray diffraction (XRD) apparatus, the transmission XRD apparatus including:

an X-ray source for irradiating a sample with an X-ray beam;

a sample holder for receiving the sample, the sample being positioned to receive the X-ray beam when held by the sample holder;

a detector for receiving X-rays transmitted through the sample and outputting an X-ray diffraction pattern therefrom; and an optical element positioned between the X-ray source and the detector, the optical element including a Montel optic and a secondary pin-hole collimator, wherein the Mantel optic has a focusing distance of about 380 mm and the collimator has an adjustable aperture size, the focusing distance extending between a center of the Mantel optic and a surface of the detector, resulting in a sample-to-detector distance of about 105 mm.

In accordance with another aspect, there is provided a method for characterizing a sample, the method including:

generating an X-ray beam with an X-ray source, the X-ray beam being transmitted through the sample before being collected by a detector;

conditioning the X-ray beam with an optical element positioned between the X-ray source and the detector, the optical element including a Mantel optic and a secondary pin-hole collimator, wherein the Mantel optic has a focusing distance of about 380 mm, the focusing distance extending between a center of the Mantel optic and a surface of the detector, resulting in a sample-to-detector distance of about 105 mm; and outputting an X-ray diffraction pattern.

In accordance with another aspect, there is provided a transmission X-ray diffraction (XRD) apparatus, the transmission XRD apparatus including:

an X-ray source for irradiating a sample with an X-ray beam;

a sample holder for receiving the sample, the sample being positioned to receive the X-ray beam when held by the sample holder;

a detector for receiving X-rays transmitted through the sample and outputting an X-ray diffraction pattern therefrom; and an optical element positioned between the X-ray source and the detector, the optical element including a Mantel optic and a secondary pin-hole collimator, wherein the Mantel optic has a focusing distance included between about 330 mm and about 430 mm and the collimator has an adjustable aperture size, the focusing distance extending between a center of the Mantel optic and a surface of the detector, resulting in a sample-to-detector distance included between about 55 mm and about 155 mm.

In accordance with another aspect, there is provided a method for characterizing a sample, the method including:

generating an X-ray beam with an X-ray source, the X-ray beam being transmitted through the sample before being collected by a detector;

conditioning the X-ray beam with an optical element positioned between the X-ray source and the detector, the optical element including a Montel optic and a secondary pin-hole collimator, wherein the Montel optic has a focusing distance included between about 330 mm and about 430 mm and the collimator has an adjustable aperture size, the focusing distance extending between a center of the Montel optic and a surface of the detector, resulting in a sample-to-detector distance included between about 55 mm and about 155 mm; and outputting an X-ray diffraction pattern.

Other objects, features, and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features may be combined with one another unless stated otherwise.

BRIEF DESCRIPTION OF THE DRAWINGS

FIG. 17 is a schematical representation of a ratio between a size of a direct X-ray beam on a detector and a sample-to-detector distance.

FIG. 18 is a schematical representation of a ratio between a diagonal distance across a surface of a detector and a sample-to-detector distance.

FIG. 19 illustrates the convergence angle or divergence of the X-ray beam in comparison to the angular range of coverage by the detector.

DETAILED DESCRIPTION

Figure 1:
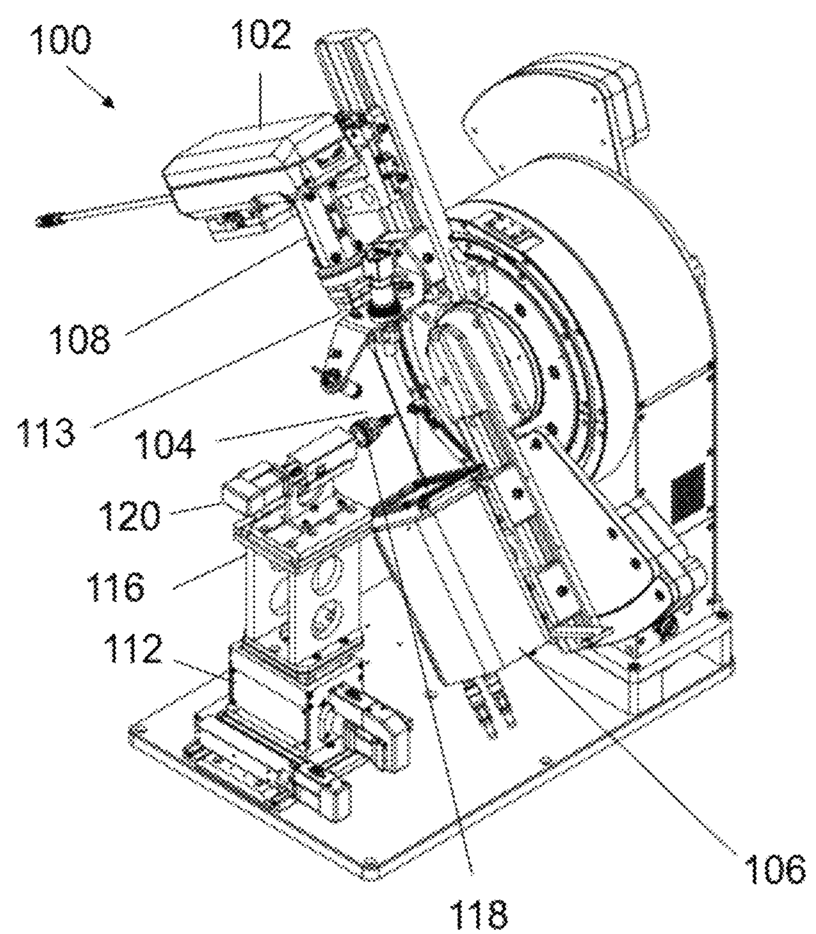
FIGS. 1 to 6 illustrate a transmission X-ray diffraction (XRD) apparatus, in accordance with one embodiment.
Figure 2:
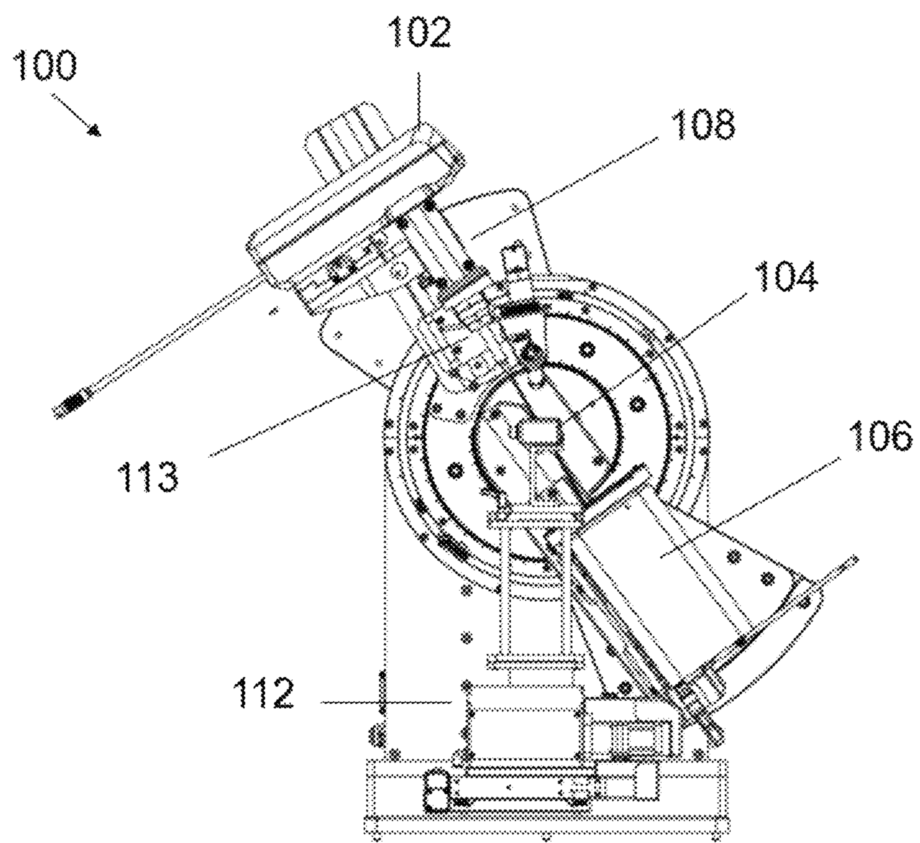
Figure 3:
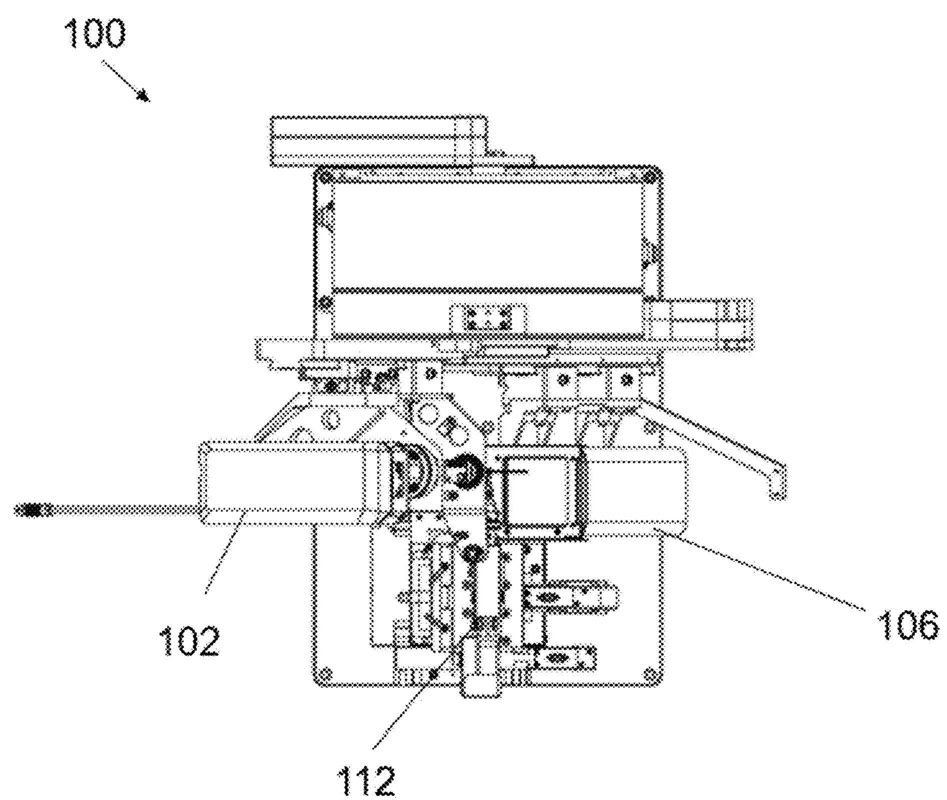
Figure 4:
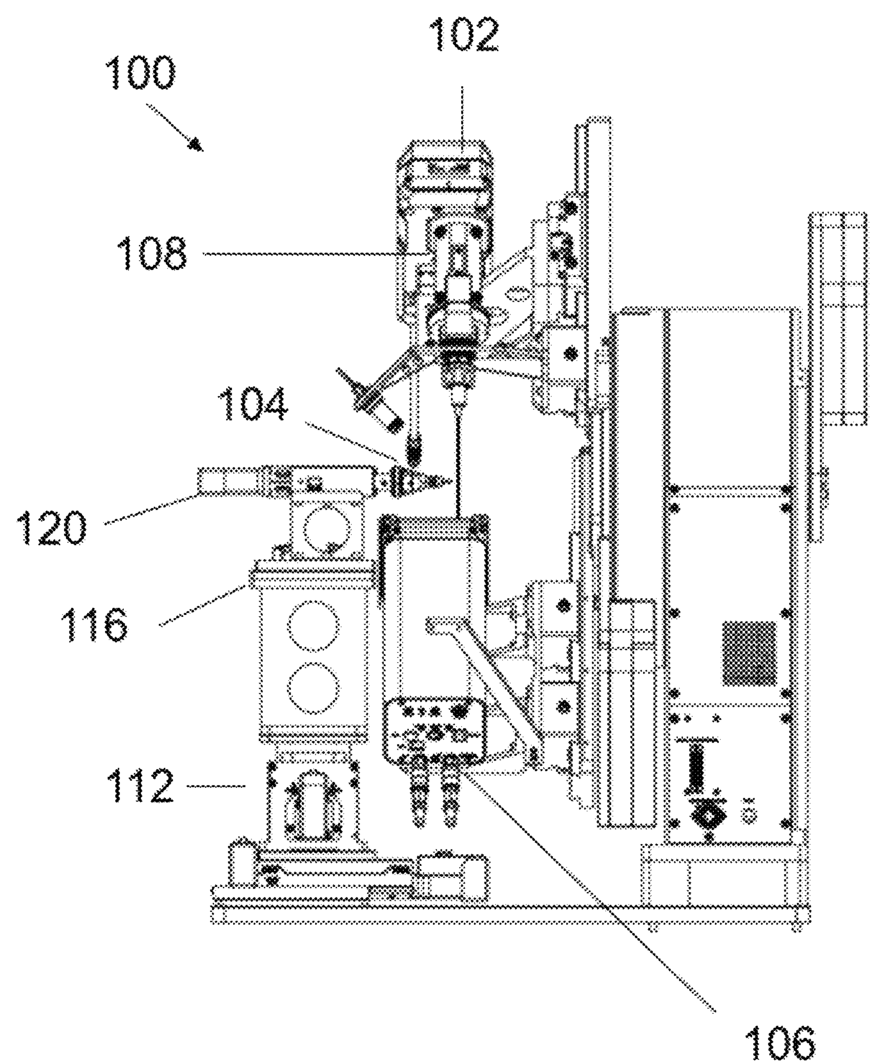
Figure 5:
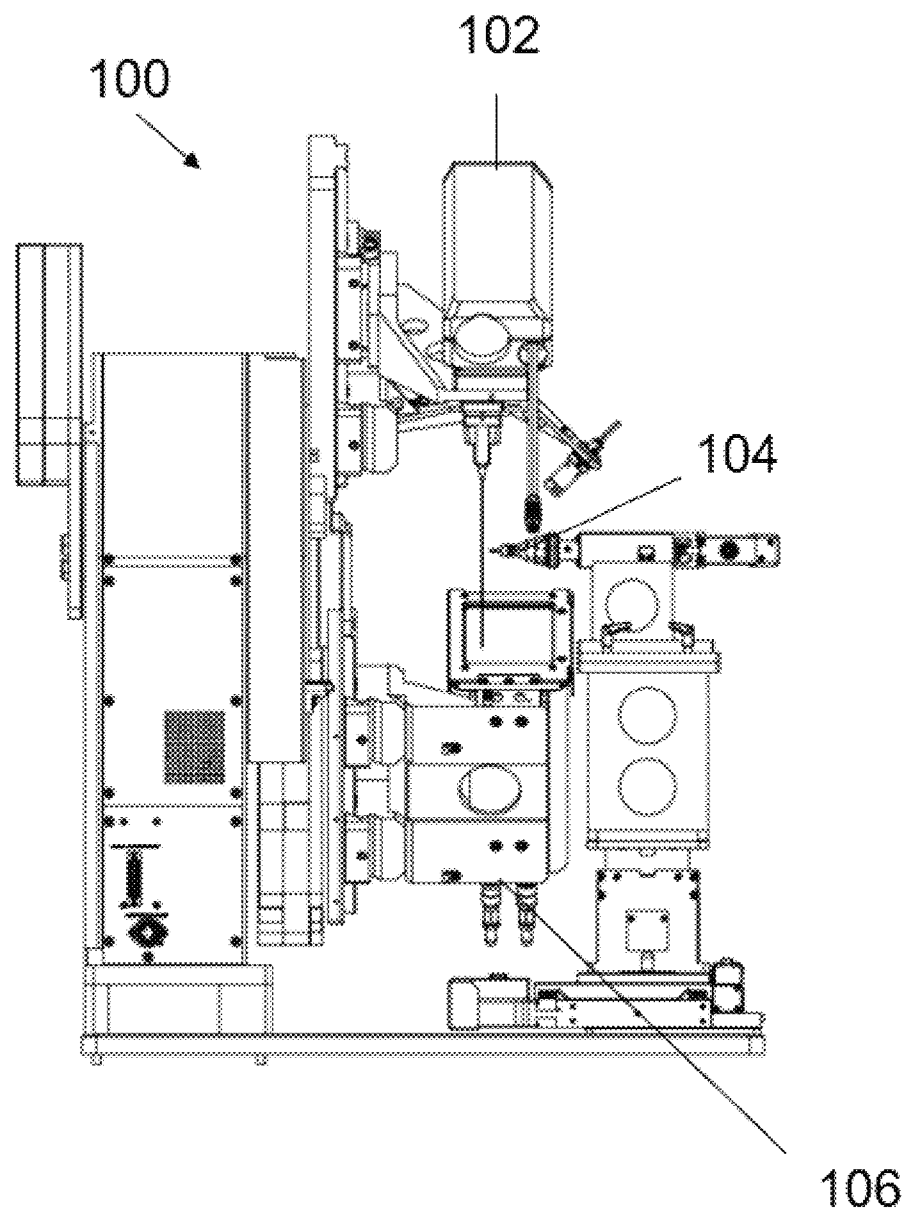
Figure 6:
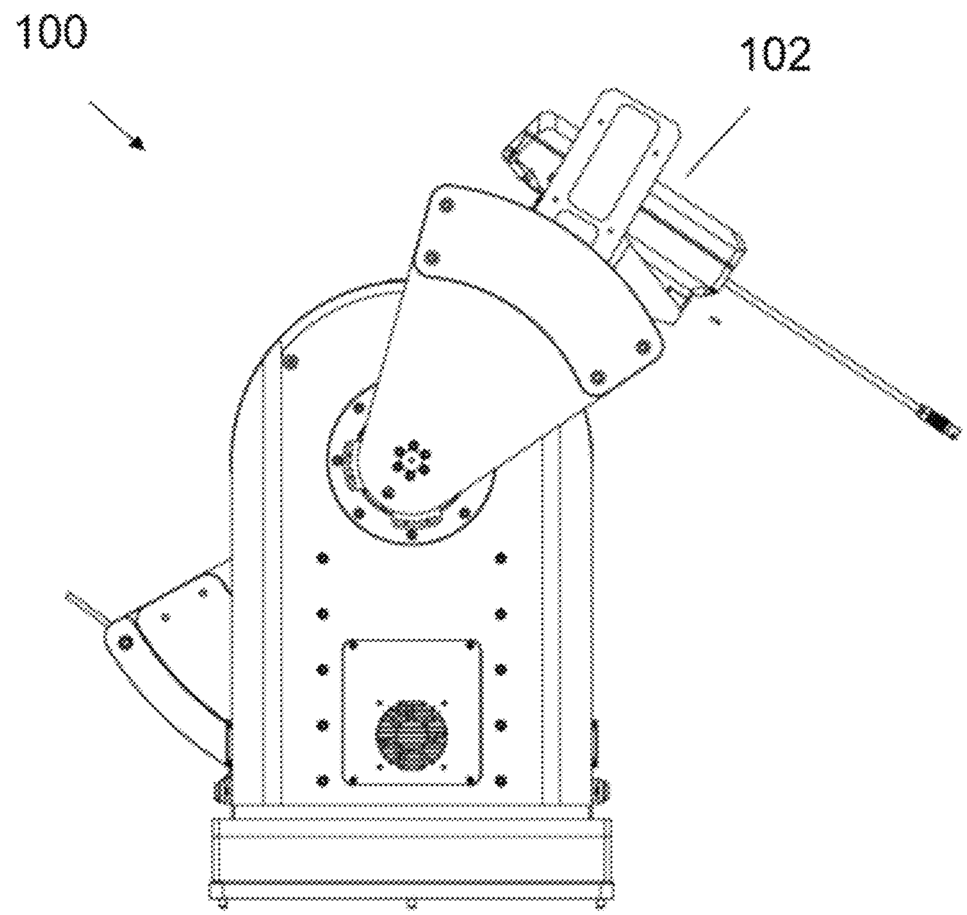
Figure 7:
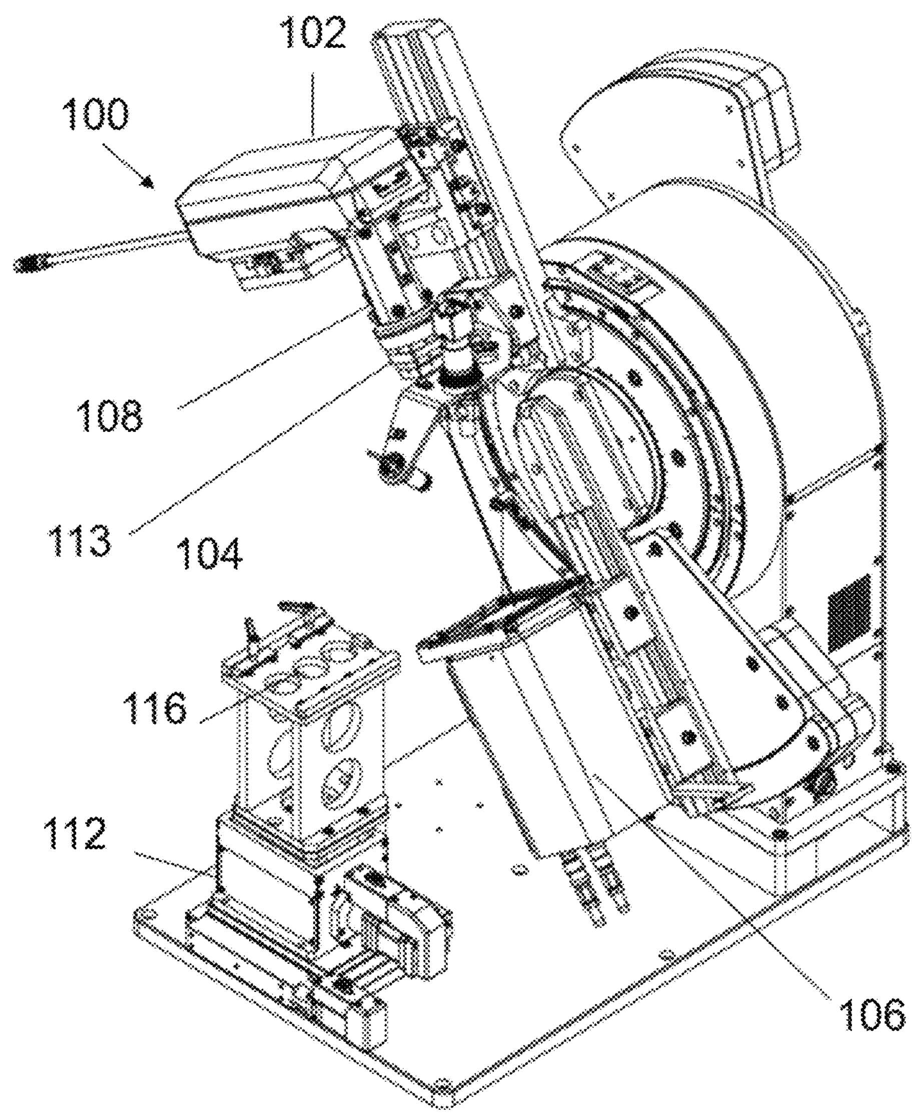
FIGS. 7 to 12 illustrate a transmission XRD apparatus, in accordance with another embodiment.
Figure 8:
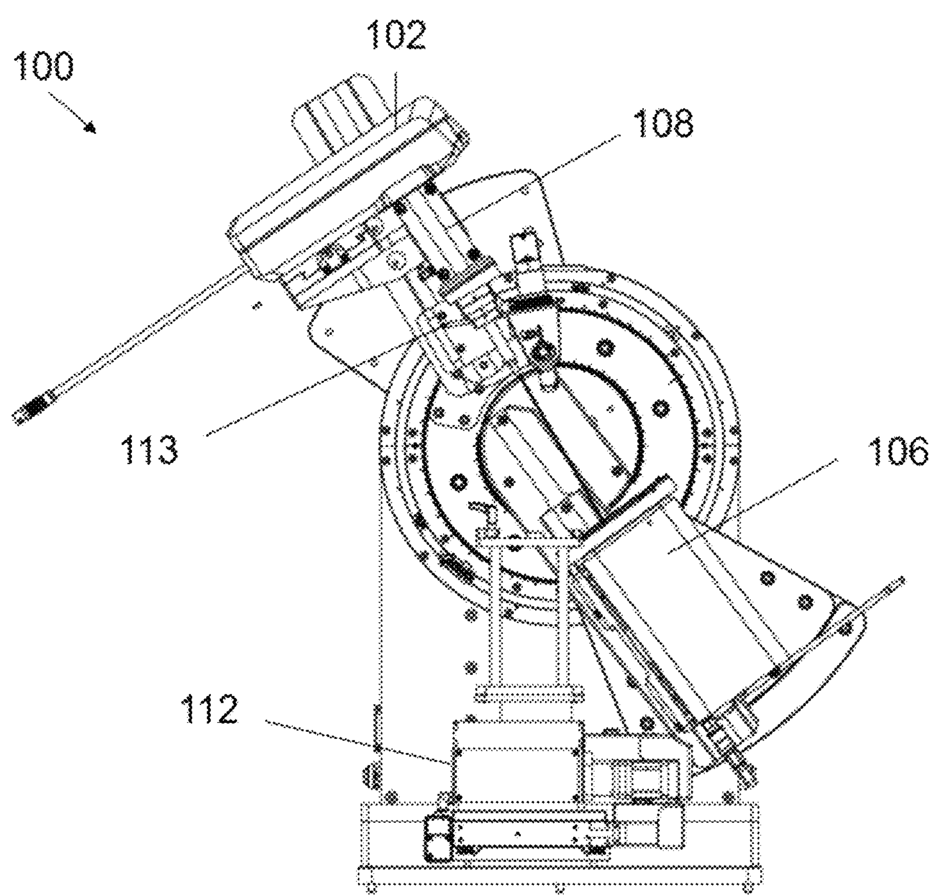
Figure 9:
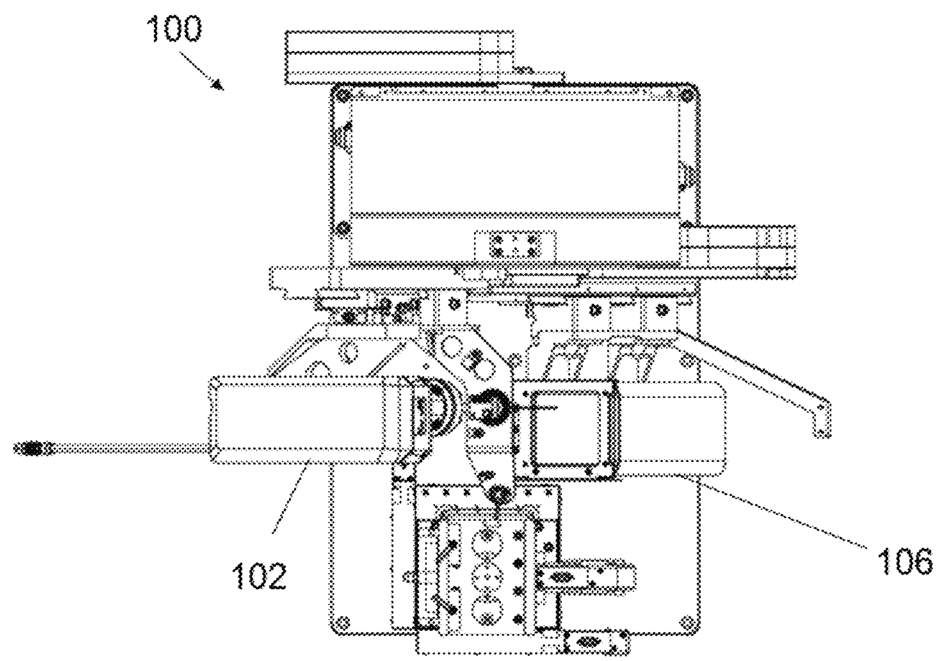
Figure 10:
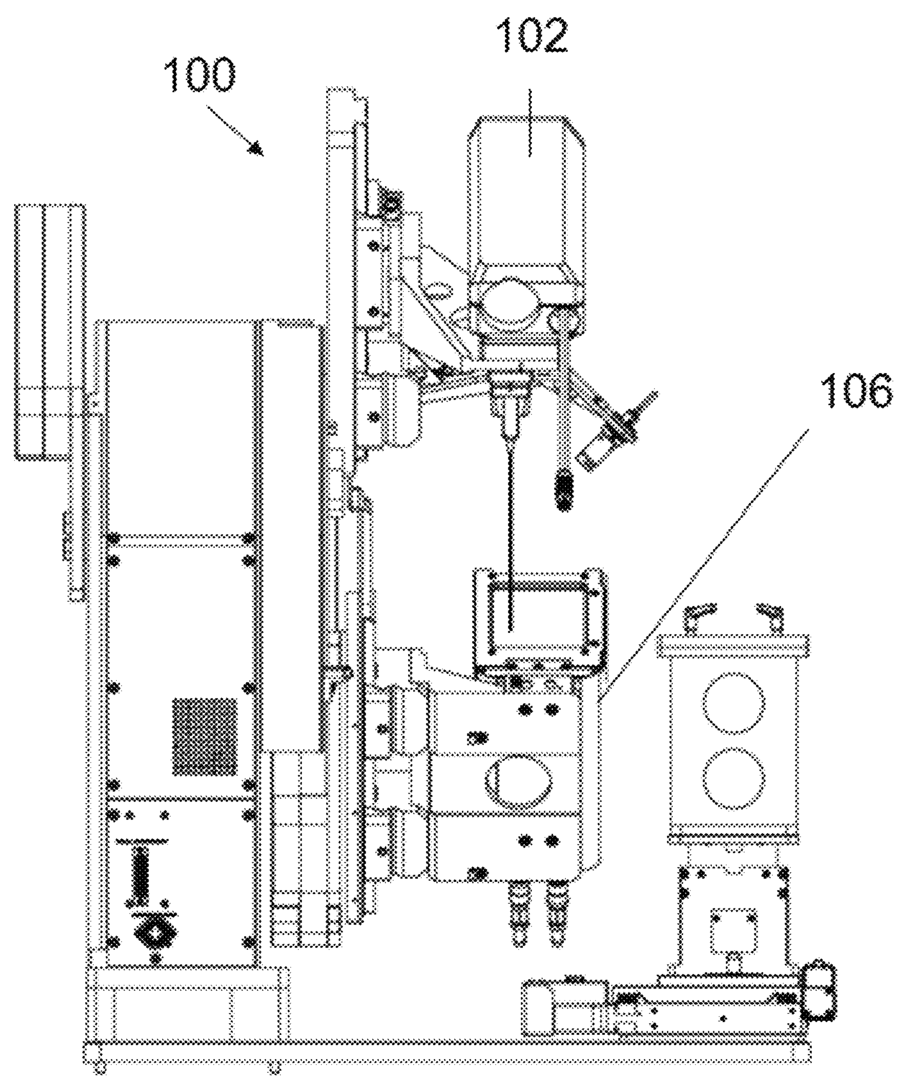
Figure 11:
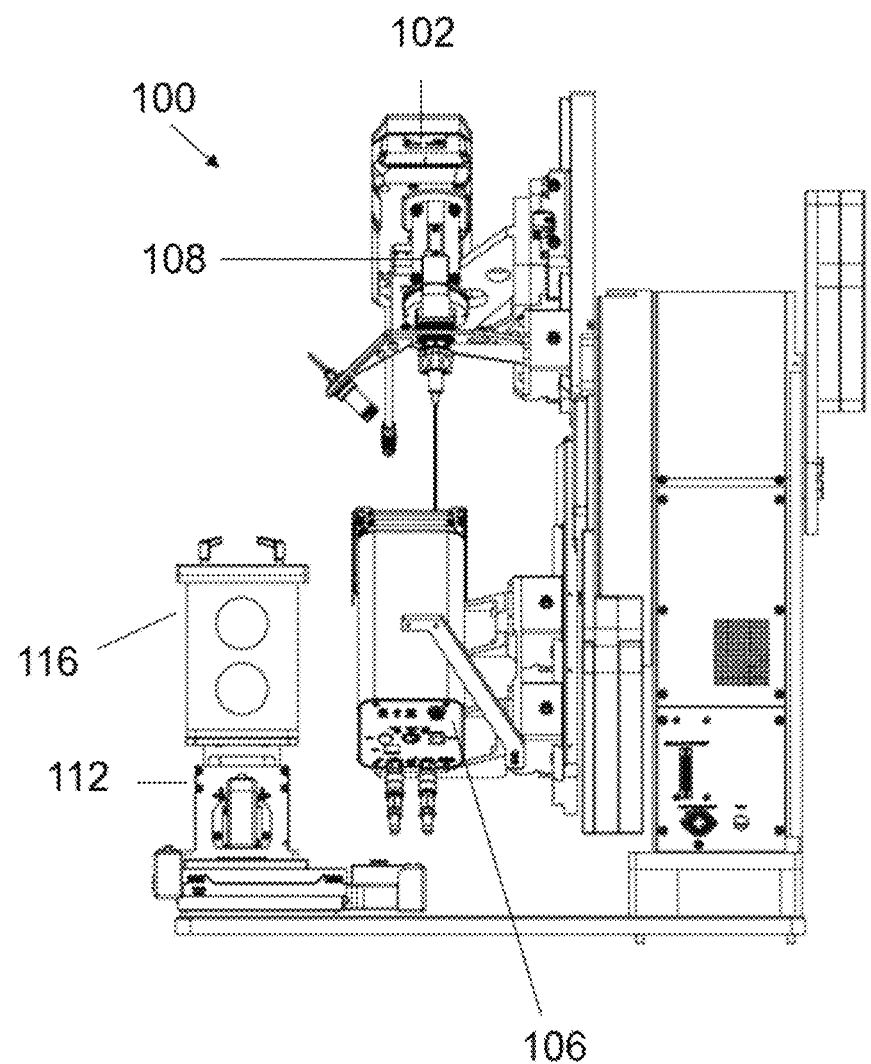
Figure 12:
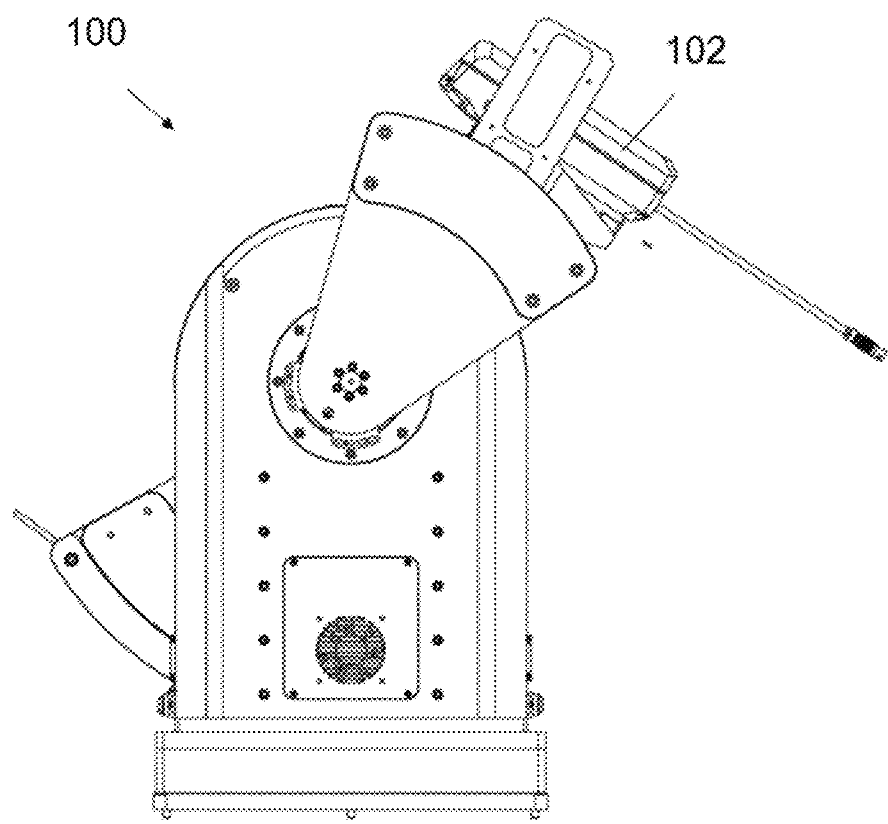
Figure 13:
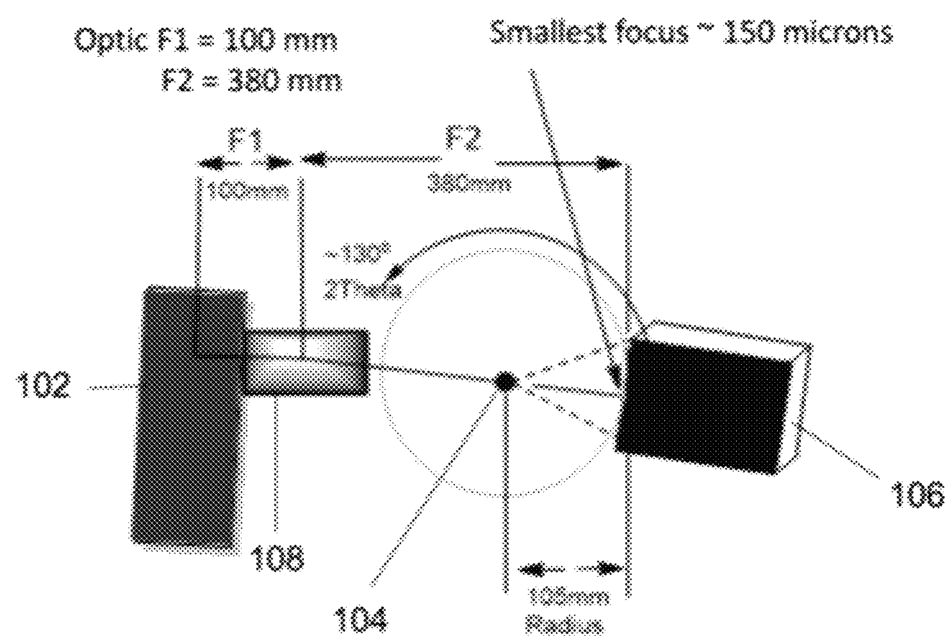
FIG. 13 illustrates the focusing geometry configuration of the transmission XRD apparatus.
Figure 14:
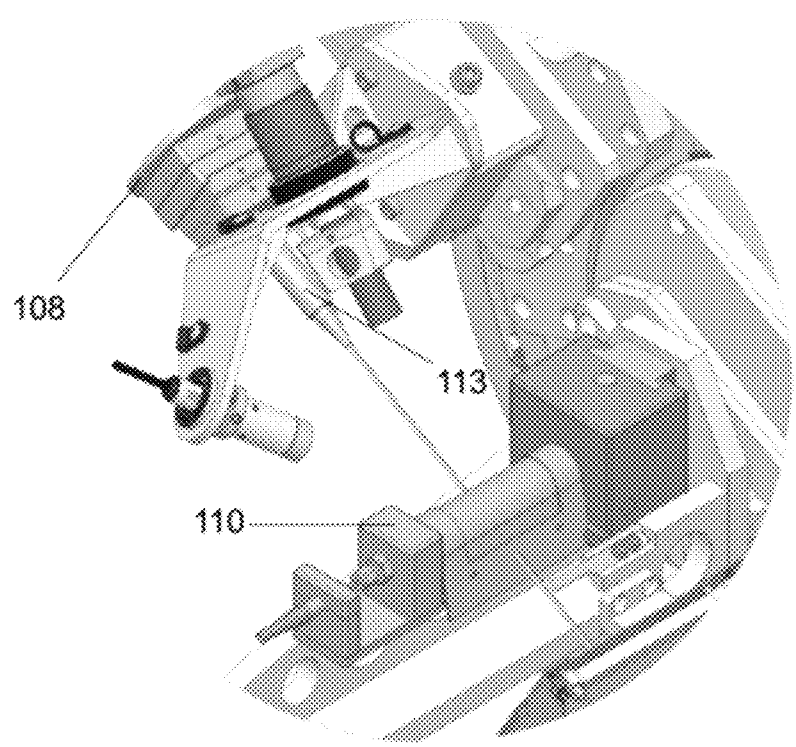
FIG. 14 is a closeup view of a capillary cell used in the transmission XRD apparatus of FIGS. 1 to 6.

In the following description, similar features in the drawings have been given similar reference numerals. In order to not unduly encumber the figures, some elements may not be indicated on some figures if they were already mentioned in preceding figures. It should also be understood herein that the elements of the drawings are not necessarily drawn to scale, and that the emphasis is instead being placed upon clearly illustrating the elements and structures of the present embodiments.

The terms "a", "an" and "one" are defined herein to mean "at least one", that is, these terms do not exclude a plural number of items, unless stated otherwise. Terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application. Moreover, it will be appreciated that positional descriptions such as "top", "bottom", "under", "left", "right", "front", "rear", "adjacent", "opposite", "parallel", "perpendicular", "inner", "outer", "internal", "external", and the like should, unless otherwise indicated, be taken in the context of the figures and should not be considered limiting.

The terms "light" and "optical", and variants and derivatives thereof, are used to refer to radiation in any appropriate region of the electromagnetic spectrum. The terms "light" and "optical" are therefore not limited to visible light, but can also include, without being limited to, the ultraviolet region and the infrared region of the electromagnetic spectrum. More specifically, in the context of the current disclosure, the terms "X-ray", "X-radiation", "light", "electromagnetic radiation", "optical", "spectral profile" "spectral waveband", derivatives and variants thereof, are used to refer to radiation in any appropriate region of the electromagnetic spectrum. By way of example, the X-rays may cover or substantially correspond to wavelengths ranging from 0.1 to 100 angstroms (i.e., energies in the range of 100 eV to 100 keV), which may be of particular interest for applications in the materials science industry for investigating the structural (e.g., atomic structure) or mechanical (e.g., residual stress) properties of samples. Also, the skilled person will appreciate that the definition of the spectral ranges, as well as the dividing lines between them, may vary depending on the technical field or the definitions under consideration, and are not meant to limit the scope of applications of the present techniques.

The terms "sample", "sample under investigation", "material", "analyzed sample", "powder", "thin films", derivatives and variants thereof are used to refer to a quantity of matter extracted or taken apart from a larger amount for analysis, or may refer to matter that is either natural (e.g., a specific chemical element found in nature), synthesized (e.g., result of a reaction between chemical compounds), or physically processed (e.g., a powder formed by scratching a thin film). A nonlimitative example of physically processing may include at least one human-made action. It will be understood that the sample intrinsically has various physical and chemical properties, which may be assessed using different instruments and methods (e.g., XRD analysis).

The terms "diffractometer", "X-ray diffraction apparatus", "XRD diffraction system", "powder diffraction instruments", "X-ray apparatus", derivatives and variants thereof refer to an apparatus configured to acquire patterns (e.g., interference patterns) obtained by recording the intensities of X-rays emanating from the sample under investigation (e.g., diffracted, as a result of the physical interaction of X-rays with the sample). This acquisition may be made in a reflection mode (e.g., Bragg-Brentano geometry), i.e., at different angles between an incident beam (i.e., X-ray beam incident on the sample) and a scattered beam (also referred to as a "diffracted beam", a "reflected beam", or any other similar expressions), or may otherwise be made in a transmission mode (e.g., Debye-Scherrer or a similar geometry), i.e., a configuration in which the incident beam passes through the sample before being collected by the detector. The acquired patterns are typically representative of given properties (e.g., structure) of the material to be inspected. Of note, the present techniques are particularly well adapted for XRD apparatus being operated in the transmission mode having been previously described. It will be understood that different attachments (also referred to as "external device", e.g., different kinds of sample holders or the like) may be attached to the XRD apparatus.

The XRD apparatus may include an X-ray source (including, for example, a vacuum-sealed X-ray tube or incorporate into a high flux source such as a synchrotron, liquid metal jet, or any other, or any neutron source), an X-ray generator applying high voltage to the X-ray source, a sample holder to hold the sample to be investigated, an X-ray detector capable of detecting X-ray and/or X-ray photons emanating or diffracted from the sample and an X-ray optical assembly (typically used for collimating, conditioning, or focusing the X-rays at the detector). The XRD pattern is obtained by recording the intensities of X-rays emanating or diffracting from the sample which contact the X-ray detector.

Unless stated otherwise, the terms "connected" and "coupled", and derivatives and variants thereof, refer herein to any structural and/or functional connection or coupling, either direct or indirect, between two or more elements. For example, the connection or coupling between the elements may be mechanical, optical, electrical, logical, or any combination thereof.

In the context of the current disclosure, the expression "focusing distance" will be used to refer to a distance between a focusing plane and the center of the optical element (e.g., a Montel mirror). The focusing distance refers, in this context, to the shortest distance between the focusing plane and the center of the optical element (e.g., the Montel mirror). When a sample is placed in the X-ray beam path it creates a new focusing circle with a radius equal to the distance from the sample to the focusing plane. If X-rays travel further or shorter than the distance between the sample and the focusing plane before they are detected, i.e., make contact with the face of the detector, they will not be in focus, leading to some broadening of the diffracted X-ray signal (Bragg reflections). This broadening can be mitigated by adding a secondary optical element (e.g., a pin-hole collimator) which further reduces the convergence angle of the X-ray beam.

The following description generally relates to techniques, apparatuses, and methods for X-ray diffraction (XRD) experiments in which the transmission mode is contemplated or preferred.

The technology and its advantages will become more apparent from the detailed description and examples that follow, which present the various embodiments of the technology. More particularly, the following sections of the description will present different embodiments of a transmission XRD apparatus as well as related methods.

With reference to FIGS. 1 to 12, embodiments of a transmission XRD apparatus 100 will be presented. The transmission XRD 100 includes an X-ray source 102, a sample holder 104, a detector 106 and an optical element 108.

The X-ray source 102 is configured for generating a direct X-ray beam. The X-ray source 102 is configured for irradiating a sample with an X-ray beam. More specifically, the X-ray source 102 is operable to produce or generate the direct X-ray beam and send the same towards the sample. The X-ray source 102 and the detector 106 defines an X-ray path along which the direct X-ray beam and the transmitted X-ray beam will propagate.

The sample holder 104 is configured for receiving the sample, such that the sample is positioned to receive the direct X-ray beam when held by the sample holder 104. In some embodiments, such as the ones illustrated in FIGS. 1 to 12, the transmission XRD apparatus 10 includes a motorized stage 112, and the motorized stage 112 may include a base 116, a goniometer head 118, and a motor assembly 120. In these embodiments, the sample holder 104 is mounted or supported by the goniometer head 118 (i.e., the sample holder 104 is a component or part of the motorized stage 112). Alternatively, in other embodiments, the sample holder 104 may be mounted to or supported by another other portions or components of the transmission XRD apparatus 100. The sample holder 104 is generally sized, positioned and oriented to hold the sample between the X-ray source 102 and the detector 106, along the X-ray path. The position and orientation of the sample holder 104 can be changed, altered, or adjusted using the motor assembly 120 and/or other component(s) of the motorized stage 112. The motor assembly 120 is in driving engagement with the goniometer head 118. The motor assembly 120 is configured to impart a relative movement to the sample with respect to the X-ray source 102 and the detector 106. In some embodiments, the motorized stage 120 is configured to provide the sample with an oscillation movement during data collection. A nonlimitative example of the movement that can be imparted to the sample is illustrated in FIG. 23. Changing the position and/or orientation of the sample may help reducing preferred crystal orientations of the sample, resulting in better data quality. Of note, the goniometer head 118 can be used for acquisition of data in the form of phi-scans on existing instruments. During those measurements, the goniometer head 118 rotates on the spindle with a tilt close to 0°.

In some embodiments, the motor assembly 120 can be configured or be programmed to drive the relative movement of the sample in defined or predetermined smaller rotational steps, which may be indexable, or oscillations to be able to perform additional experiments, such as collection of individual reflections for indexing of single crystals, structure solution, rocking curves or allowing for orienting flat substrates for glancing angle measurements (flat non-capillary substrates mounted on a pin).

In some embodiments, the present techniques are compatible with 360° phi scans coupled with movement along an axis, which can improve particle statistics (because of the numbers of crystallite orientations sampled by the beam). In some embodiments, the present techniques are compatible with data collected on single crystals, which could be used for structural studies (e.g., unit cell indexing, or structure determination or elucidation).

In some embodiments, the present techniques are compatible with omega scans. In this configuration, the axial rotation of the motor at the chi angles of the goniometer head different from 0° allows for collection of data in the form of limited angle omega scans.

Figure 15:
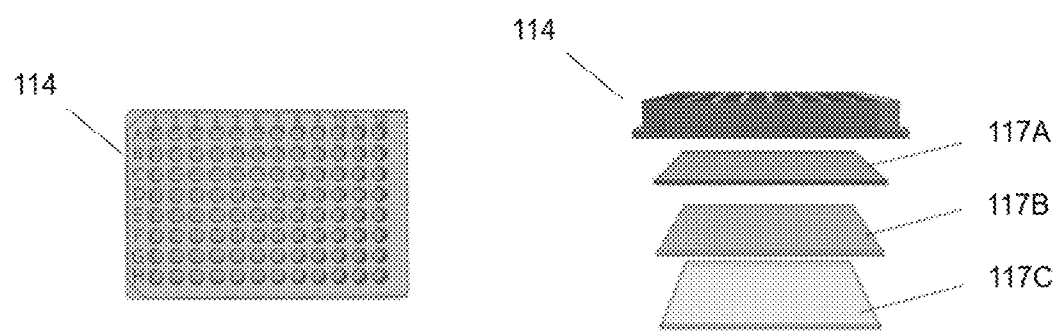
FIG. 15 is an illustration of a well plate and components thereof, in accordance with one embodiment.
Figure 16:
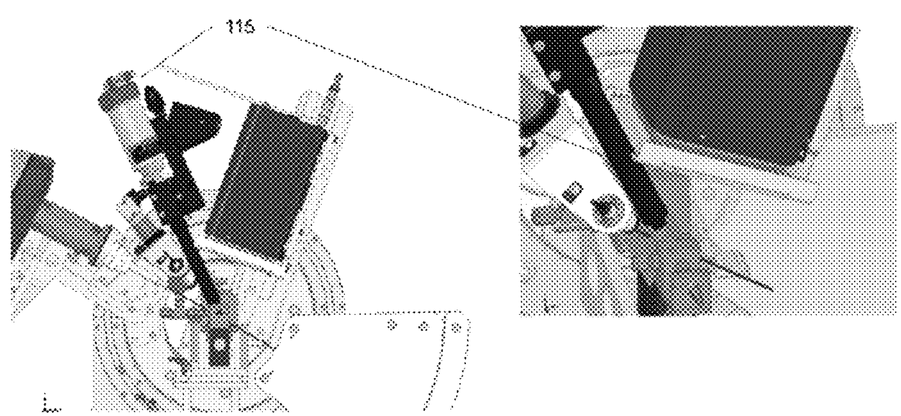
FIG. 16 illustrates a heating/cooling mechanism mounted to a transmission XRD apparatus, in accordance with one embodiment.

In some embodiments, the X-ray source 102 is operable in a vertical configuration with respect to the sample holder 104 (or a nearly vertical configuration), as illustrated in FIG. 1. This configuration may be useful for performing high-throughput identification and analysis of crystalline materials. In some embodiments, the sample holder 104 may contain a removable well plate 114, such as the one illustrated in FIG. 15. The well plate 114 may have any number of wells. In some embodiments, the well plate 114 may have 24, 48, 96, or 384 wells. In some embodiments, the well plate 114 is of a common industrially used size of approximately 86 mm by 126 mm. The bottom support of the well plate 114 which the X-ray beam travels through may consist of or at least include a thin solid or porous material, which may be embodied by a polymer, glass, or metal composition. In some embodiments, the material has a thickness between about 10 microns and about 1000 microns. In some embodiments, the material has a pore size of about 10 microns to about 1000 microns. The porous nature of some of the embodiments allows solid samples to be retained on the porous material while allowing solvent to pass through the well plate. This improves the ease of sample preparation by the user and saves considerable time required to load dry solid samples. FIG. 15 illustrates an embodiment of a well plate 114 including several layers 117A,B,C, similar to the ones having been described above.

In some embodiments, the X-ray source 102 is operable in a configuration approximately or completely horizontal with respect to the sample holder 104. This configuration may be useful for performing an in-situ analysis of materials having a structure depending on their environmental conditions, such as temperature, humidity, gas pressure, and the like.

In some embodiments, the sample holder 104 may be a capillary cell 110, which may be useful to control or maintain the environmental conditions of the sample, as will be explained in greater detail below.

The detector 106 is configured, positioned and oriented for receiving X-rays transmitted through the sample and outputting an X-ray diffraction pattern therefrom. In some embodiments, the detector 106 is a solid-state detector. In some embodiments, the solid-state detector may a Si-based detector. In some embodiments, the detector 106 is a DECTRIS EIGER2® R 1M The optical element 108 is positioned between the X-ray source 102 and the detector 106. In some embodiments, a ratio between a dimension of the direct X-ray beam projected on the detector and a sample-to-detector distance is equal or smaller than 1/570. The optical element 108 includes a Montel optic and a secondary pin-hole collimator. The Montel optic has a focusing distance of about 380 mm, the focusing distance extending between a center of the Montel optic and a surface of the detector 106, resulting in a sample-to-detector distance of about 105 mm. It should be noted that other components may be used in combination with the Montel optic to collimate, condition, affect, control and/or alter the X-ray beam prior to its interaction with the sample. In some embodiments, the transmitted X-ray beam has a focus beam size of about 183 microns by about 156 microns at the surface of the detector. The focus beam size can be adjusted by the secondary optical element, such as the secondary pin-hole collimator having been previously presented, depending on the targeted application and the sample being characterized.

The configuration described above allows for a minimum angular resolution (or "resolving power") of about 0.1°, which is defined by the ratio of the size of the X-ray beam on the detector and the sample-to-detector distance. This minimum ratio provides a sufficient angular resolution for a wide variety of applications, while traditional reflection geometry (e.g., Bragg-Brentano parafocusing geometry) provides a narrower resolution (e.g., 0.04°) this comes at the expense of a significantly lower flux (photon density) of X-rays irradiating or hitting the sample. The compromise of allowing for a larger angular resolution (e.g., about 0.1°) allows for the use of focusing multilayer mirror optics which provide a higher flux density on the sample. Stated another way, the angle made by two vectors which originate at the sample and make contact with the detector face should be less than 0.10°. as illustrated in FIG. 17. In some embodiments, the largest size of the direct X-ray beam projected on the detector is about 0.183 mm in one dimension and the detector-to-sample distance is about 105 mm, which results in an angular resolution θ of about 0.0999 (i.e., tan θ=0.183/105=0.0999).

In some embodiments, the detector 106 is configured to have an angular coverage of over 45°-2θ. In some embodiments, the angular coverage may be up to about 55°-2θ. In some embodiments, the detector 106 has a detector pixel size of about 75 microns by 75 microns. In some embodiments, the detector 106 has an active area of about 77 mm by about 79 mm. In some embodiments, and with reference to FIG. 18, a ratio between a largest diagonal dimension of the detector and the sample-to-detector distance is greater than 1. In some embodiments, and with reference to FIG. 19, a ratio between the angular range and a convergence angle of the X-rays transmitted through the sample is greater than 150. FIG. 19 illustrates the convergence angle or divergence of the X-ray beam in comparison to the angular range of coverage by the detector, which cannot be too large or would otherwise in significant broadening of the X-ray signal for any part of the detector which is not on the focusing circle (due to the detector being flat). If the convergence angle is larger, the FWHM of the diffracting reflections will be larger. In some embodiments, the angular range of coverage is at least 45° and the convergence angle of the X-ray beam is 5 mrad (or 0.29°~0.3°), originating at the optical element(s) and focusing on the detector face, which results in a ratio of about 150:1 (e.g., 45°:0.3°=150:1).

Figure 20:
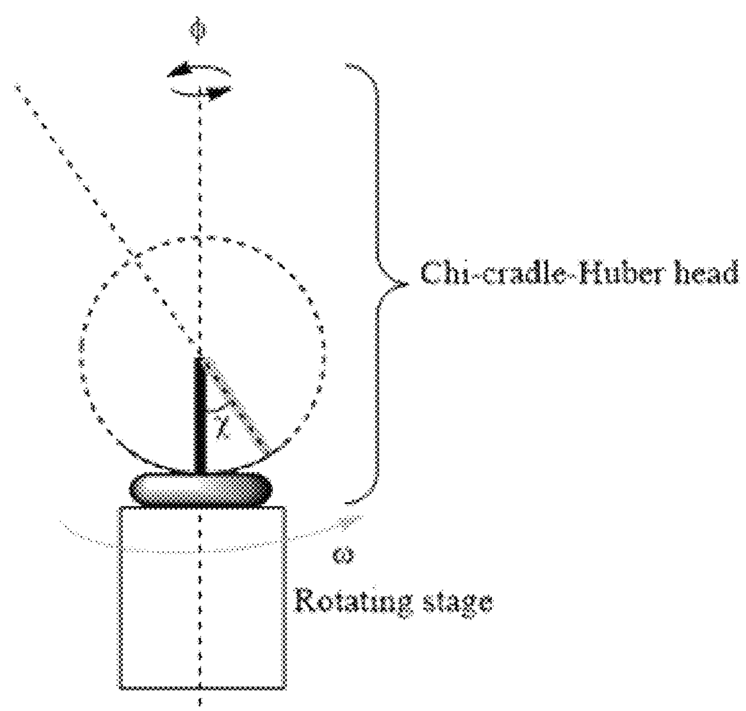
FIG. 20 is an illustration of a configuration in which a transmission XRD apparatus can be used.

FIG. 20 illustrates a configuration in which the transmission XRD apparatus can be used.

In some embodiments, the transmission XRD apparatus 100 further includes a temperature controller, the temperature controller being configured to heat or cool the sample holder 104 which may be embodied by a well plate or a capillary cell 110, as presented above.

In some embodiments, the transmission XRD apparatus 100 further includes an environmental module, the environmental module being configured to control at least one environmental condition of the capillary cell 110. In some embodiments, the environmental condition(s) may include temperature, humidity, gas pressure and other relevant properties that can affect the structure of the sample being characterized. In the embodiments wherein the transmission XRD apparatus 100 includes a motorized stage 112, the motorized stage may be configured to provide the sample with an oscillation movement during data collection. In these embodiments, the motorized stage 112 may be configured to provide the capillary cell 110 with a combination of modes of motion during collection of data, the combination of modes of motion comprising at least one rotational movement and at least one translational movement.

In some embodiments, the detector 106 is configured to be positioned at any angular position between 0°-2θ (i.e., a "direct beam" configuration) to 130°-2θ (i.e., an "angled beam" configuration).

In some embodiments, the motorized stage 112 is configured to control a position of the sample with respect to the X-ray beam. In some embodiments, the motorized stage 112 is configured to provide the sample with an oscillating movement during data collection. The motorized stage 112 can also provide the sample holder 104 with a displacement along any one of an X, Y and Z direction. The motorized stage can be used for displacing diffraction plates in the vertical configuration (such as 96 well plates) or the capillary cell in the horizontal configuration. Nonlimitative examples of movement being imparted to the sample are illustrated in FIGS. 21 and 22.

In some embodiments, the capillary cell 110 is mounted to the motorized stage 112. In existing solutions, the capillary cell is typically mounted to the goniometer itself and the movement or displacement of the capillary cell is somewhat limited. The motorized stage 112 according to the present techniques can translate the sample holder 104 in an upward and a downward, but also in an "in and out" direction, i.e., towards a center of the goniometer and towards the doors of the XRD apparatus 100). This motion allows the capillary cell 110 to be oscillated during the data collection and improves particle statistics and diffraction signal.

In some embodiments, the transmission XRD apparatus 100 further includes a camera and a laser focusing system mounted near or on the optical element 108. The video camera and laser focusing system can be used for aligning the sample into the path of the X-ray beam. The sample can be contained within a well plate or capillary tube, such as the ones having been previously described. The center of the video camera's focus and the laser beam intersect at a defined position (center of the goniometer) which allows the user a visual way to ensure that the sample is at the correct sample to source distance prior to data collection.

In some embodiments, the camera and the laser focusing system may be mounted to a tube arm above the optical element 108.

In some embodiments, the detector 106 can be positioned at any angular position from about 0° 2theta to about 130° 2theta.

In accordance with another broad aspect, there is provided a method for characterizing a sample, using the transmission XRD apparatus 100 having been described.

The method includes a step of generating an X-ray beam with an X-ray source. The X-ray beam is transmitted through the sample before being collected by a detector, meaning that the XRD apparatus is operated in a transmission mode.

In some embodiments, the method may include a step of conditioning the X-ray beam with an optical element positioned between the X-ray source and the detector. The optical element includes a Montel optic, wherein the Montel optic has a focusing distance of about 380 mm, the focusing distance extending between a center of the Montel optic and a surface of the detector, resulting in a sample-to-detector distance of about 105 mm.

In some embodiments, the method may include a step of conditioning the direct X-ray beam with an optical element positioned between the X-ray source and the detector. The optical element includes a Montel optic and a secondary pin-hole collimator collectively adapted to focus the direct X-ray beam on the detector, wherein a ratio between a dimension of the direct X-ray beam projected on the detector and a sample-to-detector distance is equal or smaller than 1/570.

The method also includes outputting an X-ray diffraction pattern. The XRD pattern is representative of the sample being characterized.

In some embodiments, the method may include a step of providing a relative movement to the sample with respect to the X-ray source and the detector with a motorized stage, the motorized stage being similar to one having been previously described.

As previously mentioned, the present techniques may be useful in different types of application such as high-throughput identification and analysis of crystalline materials and in-situ or operando analysis of materials which change their structure under different environmental conditions, such as temperature, humidity, gas pressure, and the like.

In some embodiments the system has an additional heating/cooling system 115 for altering the temperature of the sample, for example when the sample is contained in the capillary tube.

The design of the present techniques benefits from the combination of a transmission XRD apparatus and Montel optics to achieve better results than the results obtained with existing solutions, notably in terms of acquisition time, angular resolution, reliability, ease of use and modularity.

The present techniques are also more economical and advantageous than existing solutions because less material (sample quantity) is required to perform the XRD analysis thereof.

Additional optical element 113 includes a collimator with a pin-hole orifice for further shaping and reducing the X-ray beam size. Of note, the collimator can be changed (either manually, semi-automatically or automatically) to provide different aperture sizes, i.e., to change the orifice size from about 0.1 mm to about 10 mm. The function of this additional optical element (previously referred to as a secondary pin-hole collimator) will now be described. Any focusing beam X-ray diffraction system reaches its optimal focus at a specific location on the detector, which is defined as the point of nearest intersection (PONI). As the diffracted X-ray beam moves away from the PONI, the beam will begin to diverge as the distance from the sample to the flat detector face will increase. This increase in distance at the edges of the detector can be significant adding an addition path length of about 10% to about 35%, depending on the orientation of the detector face. As mentioned, this increased distance travelled by the X-ray beam will begin to diverge and broaden the signal; however, by utilizing a secondary pin-hole collimator 113 this effect can be minimized resulting in minimal signal broadening across the entire detector face. The addition of this secondary optical element generally enhances, and may in some embodiments, significantly improves the angular resolution of the instrument.

The double mirror Montel X-ray optic previously described has a specific focus beam size and focusing distance that give the XRD apparatus a specific sample to detector focusing distance and allow the use of a relatively large solid-state detector. As mentioned above, a specific focusing distance of about 380 mm between the center of the optic to the detector, gives the instrument a sample to detector distance of 105 mm, which results in a large detector angular range of over 55 deg 2theta. Most existing instruments have a configuration which provides about 35 deg 2theta of coverage, which is significantly smaller than what can be achieved with the present techniques. This larger coverage angle significantly speeds up the analysis as only a single detector position is required for different types of materials to obtain the relevant information.

Most existing X-ray diffraction systems utilized for high-throughput and in-situ analysis make use of a parallel beam (low angular divergence) as it allows the user to be able to set custom sample to detector distances with minimal signal distortion due to divergence of the X-ray beam. A parallel beam also makes X-ray diffraction systems capable of other types of XRD analysis, appealing to a wider user group. However, a focused beam as described herein results in higher intensity, better particle statistics, and results in better angular resolution when the same beam size and sample to detector distance is compared to a parallel beam configuration. While X-ray systems have been developed with focusing beams previously with smaller area detectors, the present techniques rely on a specific focusing distance, with a focused X-ray beam utilizing two optical elements (focusing Montel X-ray optic and a collimator with a defined pin-hole size), and a relatively large solid-state Si detector.

In summary, the present techniques combine an X-ray source with Montel mirror optic, and secondary pin-hole collimator which results in a specific focus beam size and focusing distance. The XRD apparatus having been described has two default collection positions for the X-ray source and a range of detector positions from about 0 to 130 degrees 2theta. The first configuration is typically useful for high-throughput analysis, in which the X-ray source is in a vertical configuration and X-ray beam passes through a well plate with samples in the wells. The second configuration is typically useful for situations in which the X-ray source is in a more horizontal configuration and the X-ray beam passes through a capillary cell.

Some advantages of the present techniques will now be presented. The design of the optical element allows for a greater intensity compared to parallel beam systems, a higher angular resolution (FWHM of the diffraction peaks when compared to parallel beams of the same size and sample-to-detector distances), and better particle statistics due to convergence angle of source compared to parallel beam. The size of the detector and sample-to-detector distance allow for a large angular range of coverage. The sample positioning system allows for better particle statistics and data quality when oscillating a capillary sample. All of these enhancements result in the X-ray instrument requiring less material or a smaller amount of a substance to be adequately characterized, because of the increased intensity and faster data collection of the present techniques.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the scope defined in the appended claims.

Some of the implementations described in the present description include the following items:

1. A transmission X-ray diffraction (XRD) apparatus, the transmission XRD apparatus comprising:

- an X-ray source for generating a direct X-ray beam;
- a sample holder for receiving the sample, the sample being positioned to receive the direct X-ray beam when held by the sample holder;
- a detector for receiving X-rays transmitted through the sample and outputting an X-ray diffraction pattern therefrom; and
- an optical element positioned between the X-ray source and the detector, the optical element comprising a Montel optic and a secondary pin-hole collimator collectively adapted to focus the direct X-ray beam on the detector, wherein a ratio between a dimension of the direct X-ray beam projected on the detector and a sample-to-detector distance is equal or smaller than 1570.

2. The transmission X/RD apparatus of item 1, wherein the detector is a solid-state detector.

3. The transmission XRD apparatus of item 2, wherein the solid-state detector is a Si-based detector.

4. The transmission XRD apparatus of any one of items 1 to 3, wherein the detector is a DECTRIS EIGER2® R 1M.

5. The transmission XRD apparatus of any one of items 1 to 4, wherein the X-ray beam transmitted through the sample has a focus beam size of about 183 microns by about 156 microns at the surface of the detector.

6. The transmission XRD apparatus of any one of items 1 to 5, wherein the detector is configured to have an angular coverage of at least 45°-2θ.

7. The transmission XRD apparatus of item 6, wherein the angular coverage is about 55°-2θ.

8. The transmission XRD apparatus of item 6 or 7, wherein the detector has a detector pixel size of about 75 microns by 75 microns.

9. The transmission XRD apparatus of any one of items 6 to 8, wherein the detector has an active area of about 77 mm by about 79 mm.

10. The transmission XRD apparatus of item 9, wherein a ratio between a largest diagonal dimension of the detector and the sample-to-detector distance is greater than 1.

11. The transmission XRD apparatus of item 6 or 7, wherein a ratio between the angular range and a convergence angle of the X-rays transmitted through the sample is greater than 150.

12. The transmission XRD apparatus of any one of items 1 to 11, wherein the X-ray source is operable in a vertical configuration with respect to the sample holder.

13. The transmission XRD apparatus of item 12, wherein the sample holder is a well plate with a solid or a porous bottom support.

14. The transmission XRD apparatus of any one of items 1 to 13, wherein the X-ray source is operable in a configuration approximately or completely horizontal with respect to the sample holder.

15. The transmission XRD apparatus of item 14, wherein the sample holder is a capillary cell.

16. The transmission XRD apparatus of item 15, further comprising a temperature controller, the temperature controller being configured to heat or cool the capillary cell.

17. The transmission XRD apparatus of item 15 or 16, further comprising an environmental module, the environmental module being configured to control at least one environmental condition of the capillary cell.

18. The transmission XRD apparatus of item 17, wherein said at least one environmental condition comprises humidity and/or gas pressure.

19. The transmission XRD apparatus of any one of items 1 to 18, wherein the detector is configured to be positioned at any angular position between 0°-2θ to 130°-2θ.

20. The transmission XRD apparatus of any one of items 1 to 19, further comprising a camera and a laser focusing system mounted near or on the optical element.

21. A method for characterizing a sample, the method comprising:
- generating a direct X-ray beam with an X-ray source, the direct X-ray beam being transmitted through the sample before being collected by a detector;
- conditioning the direct X-ray beam with an optical element positioned between the X-ray source and the detector, the optical element comprising a Montel optic and a secondary pin-hole collimator collectively adapted to focus the direct X-ray beam on the detector, wherein a ratio between a dimension of the direct X-ray beam projected on the detector and a sample-to-detector distance is equal or smaller than 1/570; and
- outputting an X-ray diffraction pattern.

22. A transmission X-ray diffraction (XRD) apparatus, the transmission XRD apparatus comprising:
- an X-ray source for irradiating a sample with an X-ray beam;
- a detector for receiving X-rays transmitted through the sample and outputting an X-ray diffraction pattern therefrom;
- an optical element positioned between the X-ray source and the detector, the optical element comprising a Montel optic and a secondary pin-hole collimator collectively adapted to focus the X-ray beam on the detector; and
- a motorized stage, comprising:
  - a base;
  - a goniometer head supported by the base;
  - a sample holder for receiving the sample, the sample holder being mounted to the goniometer head, such that the sample is positioned to receive the X-ray beam when held by the sample holder; and
  - a motor assembly in driving engagement with the goniometer head, the motor assembly being configured to impart a relative movement to the sample with respect to the X-ray source and the detector.

23. The transmission X-ray diffraction (XRD) apparatus of item 22, wherein a ratio between a dimension of a direct X-ray beam projected on the detector and a sample-to-detector distance is equal or smaller than 1/570.

24. The transmission XRD apparatus of item 22 or 23, wherein the motorized stage is configured to provide the sample with an oscillation movement during data collection.

25. The transmission XRD apparatus of any one of items 22 to 24, wherein the detector is a solid-state detector.

26. The transmission XRD apparatus of item 25, wherein the solid-state detector is a Si-based detector.

27. The transmission XRD apparatus of any one of items 26, wherein the detector is a DECTRIS EIGER2® R 1M.

28. The transmission XRD apparatus of any one of items 22 to 27, wherein the X-ray beam transmitted through the sample has a focus beam size of about 183 microns by about 156 microns at the surface of the detector.

29. The transmission XRD apparatus of any one of items 22 to 28, wherein the detector is configured to have an angular coverage of at least 45°-2θ.

30. The transmission XRD apparatus of item 29, wherein the angular coverage is about 55°-2θ.

31. The transmission XRD apparatus of item 29 or 30, wherein the detector has a detector pixel size of about 75 microns by 75 microns.

32. The transmission XRD apparatus of any one of items 29 to 31, wherein the detector has an active area of about 77 mm by about 79 mm.

33. The transmission XRD apparatus of item 32, wherein a ratio between a largest diagonal dimension of the detector and the sample-to-detector distance is greater than 1.

34. The transmission XRD apparatus of item 29 or 30, wherein a ratio between the angular range and a convergence angle of the X-rays transmitted through the sample is greater than 150.

35. The transmission XRD apparatus of any one of items 22 to 34, wherein the X-ray source is operable in a vertical configuration with respect to the sample holder.

36. The transmission XRD apparatus of item 35, wherein the sample holder is a well plate with a solid or a porous bottom support.

37. The transmission XRD apparatus of any one of items 22 to 36, wherein the X-ray source is operable in a configuration approximately or completely horizontal with respect to the sample holder.

38. The transmission XRD apparatus of item 37, wherein the sample holder is a capillary cell.

39. The transmission XRD apparatus of item 38, further comprising a temperature controller, the temperature controller being configured to heat or cool the capillary cell.

40. The transmission XRD apparatus of item 38 or 39, further comprising an environmental module, the environmental module being configured to control at least one environmental condition of the capillary cell.

41. The transmission XRD apparatus of item 40, wherein said at least one environmental condition comprises humidity and/or gas pressure.

42. The transmission XRD apparatus of item 22 to 41, wherein the motorized stage is configured to provide the capillary cell with a combination of modes of motion during collection of data, the combination of modes of motion comprising at least one rotational movement and at least one translational movement.

43. The transmission XRD apparatus of any one of items 22 to 42, wherein the detector is configured to be positioned at any angular position between 0°-2θ to 130°-2θ.

44. The transmission XRD apparatus of any one of items 1 to 43, further comprising a camera and a laser focusing system mounted near or on the optical element.

45. A method for characterizing a sample, the method comprising:

generating an X-ray beam with an X-ray source, the X-ray beam being transmitted through the sample before being collected by a detector;

providing a relative movement to the sample with respect to the X-ray source and the detector with a motorized stage, the motorized stage comprising:

a base;

a goniometer head supported by the base;

a sample holder for receiving the sample, the sample holder being mounted to the goniometer head, such that the sample is positioned to receive the X-ray beam when held by the sample holder; and a motor assembly in driving engagement with the goniometer head, the motor assembly being configured to impart the relative movement to the sample with respect to the X-ray source and the detector;

conditioning the X-ray beam with an optical element positioned between the X-ray source and the detector, the optical element comprising a Montel optic and a secondary pin-hole collimator; and outputting an X-ray diffraction pattern.

46. A transmission X-ray diffraction (XRD) apparatus, the transmission XRD apparatus including:

an X-ray source for irradiating a sample with an X-ray beam;

a sample holder for receiving the sample, the sample being positioned to receive the X-ray beam when held by the sample holder;

a detector for receiving X-rays transmitted through the sample and outputting an X-ray diffraction pattern therefrom; and an optical element positioned between the X-ray source and the detector, the optical element including a Montel optic and a secondary pin-hole collimator, wherein the Montel optic has a focusing distance of about 380 mm and the collimator has an adjustable aperture size, the focusing distance extending between a center of the Montel optic and a surface of the detector, resulting in a sample-to-detector distance of about 105 mm.

47. The transmission XRD apparatus of item 46, wherein the detector is a solid-state detector.

48. The transmission XRD apparatus of item 47, wherein the solid-state detector is a Si-based detector.

49. The transmission XRD apparatus of any one of items 46 to 48, wherein the detector is a DECTRIS EIGER2® R 1M.

50. The transmission XRD apparatus of any one of items 46 to 49, wherein the X-ray beam has a focus beam size of about 183 microns by about 156 microns at the surface of the detector.

51. The transmission XRD apparatus of any one of items 46 to 50, wherein the detector is configured to have an angular coverage of at least 45°-2θ.

52. The transmission XRD apparatus of item 21, wherein the angular coverage is about 55°-2θ.

53. The transmission XRD apparatus of any one of items 46 to 52, wherein the detector has a detector pixel size of about 75 microns by 75 microns.

54. The transmission XRD apparatus of any one of items 46 to 53, wherein the detector has an active area of about 77 mm by about 79 mm.

55. The transmission XRD apparatus of any one of items 46 to 54, wherein the X-ray source is operable in a vertical configuration with respect to the sample holder.

56. The transmission XRD apparatus of item 5, wherein the sample holder is a well plate with a solid or a porous bottom support.

57. The transmission XRD apparatus of any one of items 46 to 56, wherein the X-ray source is operable in a configuration approximately or completely horizontal with respect to the sample holder.

58. The transmission XRD apparatus of item 57, wherein the sample holder is a capillary cell.

59. The transmission XRD apparatus of item 55, further including a temperature controller, the temperature controller being configured to heat or cool the capillary cell.

60. The transmission XRD apparatus of item 58 or 59, further including an environmental module, the environmental module being configured to control at least one environmental condition of the capillary cell.

61. The transmission XRD apparatus of item 60, wherein said at least one environmental condition includes humidity and/or gas pressure.

62. The transmission XRD apparatus of any one of items 46 to 61 wherein the detector is configured to be positioned at any angular position between 0°-2θ to 130°-2θ.

63. The transmission XRD apparatus of any one of items 46 to 62, further including a motorized stage to control a position of the sample with respect to the X-ray beam.

64. The transmission XRD apparatus of item 63, wherein the motorized X,Y stage is configured to provide the sample with an oscillation movement during data collection.

65. The transmission XRD apparatus of any one of items 46 to 64, further including a camera and a laser focusing system mounted near or on the optical element.

66. A method for characterizing a sample, the method including:

generating an X-ray beam with an X-ray source, the X-ray beam being transmitted through the sample before being collected by a detector;

conditioning the X-ray beam with an optical element positioned between the X-ray source and the detector, the optical element including a Montel optic and a secondary pin-hole collimator, wherein the Mantel optic has a focusing distance of about 380 mm, the focusing distance extending between a center of the Montel optic and a surface of the detector, resulting in a sample-to-detector distance of about 105 mm; and outputting an X-ray diffraction pattern.

67. A transmission X-ray diffraction (XRD) apparatus, the transmission XRD apparatus including:

an X-ray source for irradiating a sample with an X-ray beam;

a sample holder for receiving the sample, the sample being positioned to receive the X-ray beam when held by the sample holder;

a detector for receiving X-rays transmitted through the sample and outputting an X-ray diffraction pattern therefrom; and an optical element positioned between the X-ray source and the detector, the optical element including a Montel optic and a secondary pin-hole collimator, wherein the Montel optic has a focusing distance included between about 330 mm and about 430 mm and the collimator has an adjustable aperture size, the focusing distance extending between a center of the Montel optic and a surface of the detector, resulting in a sample-to-detector distance included between about 55 mm and about 155 mm.

68. The transmission XRD apparatus of item 67, wherein the focusing distance is included between about 370 mm and about 390 mm.

69. The transmission XRD apparatus of item 67 or 68, wherein the sample-to-detector distance is included between about 95 mm and about 115 mm.

70. The transmission XRD apparatus of any one of items 37 to 69, wherein the detector is a solid-state detector.

71. The transmission XRD apparatus of item 70, wherein the solid-state detector is a Si-based detector.

72. The transmission XRD apparatus of any one of items 67 to 71, wherein the detector is a DECTRIS EIGER2® R 1M.

73. The transmission XRD apparatus of any one of items 67 to 72, wherein the X-ray beam has a focus beam size ranging from about 150 microns to about 250 microns at the surface of the detector.

74. The transmission XRD apparatus of any one of items 57 to 73, wherein the detector is configured to have an angular coverage of at least 45°-2θ.

75. The transmission XRD apparatus of item 74, wherein the angular coverage is about 55°-2θ.

76. The transmission XRD apparatus of any one of items 67 to 75, wherein the detector has a detector pixel size of about 75 microns by 75 microns.

77. The transmission XRD apparatus of any one of items 67 to 76, wherein the detector has an active area of about 77 mm by about 79 mm.

78. The transmission XRD apparatus of any one of items 67 to 77, wherein the X-ray source is operable in a vertical configuration with respect to the sample holder.

79. The transmission XRD apparatus of item 78, wherein the sample holder is a well plate with a solid or a porous bottom support.

80. The transmission XRD apparatus of any one of items 67 to 79, wherein the X-ray source is operable in a configuration approximately or completely horizontal with respect to the sample holder.

81. The transmission XRD apparatus of item 80, wherein the sample holder is a capillary cell.

82. The transmission XRD apparatus of item 81, further including a temperature controller, the temperature controller being configured to heat or cool the capillary cell.

83. The transmission XRD apparatus of item 81 or 82, further including an environmental module, the environmental module being configured to control at least one environmental condition of the capillary cell.

84. The transmission XRD apparatus of item 83, wherein said at least one environmental condition includes humidity and/or gas pressure.

85. The transmission XRD apparatus of any one of items 67 to 84 wherein the detector is configured to be positioned at any angular position between 0°-2θ to 130°-2θ.

86. The transmission XRD apparatus of any one of items 67 to 85, further including a motorized stage to control a position of the sample with respect to the X-ray beam.

87. The transmission XRD apparatus of item 86, wherein the motorized stage is configured to provide the sample with an oscillating movement during data collection.

88. The transmission XRD apparatus of any one of items 67 to 87, further including a camera and a laser focusing system mounted near or on the optical element.

89. A method for characterizing a sample, the method including:

generating an X-ray beam with an X-ray source, the X-ray beam being transmitted through the sample before being collected by a detector;

conditioning the X-ray beam with an optical element positioned between the X-ray source and the detector, the optical element including a Montel optic and a secondary pin-hole collimator, wherein the Montel optic has a focusing distance included between about 330 mm and about 430 mm and the collimator has an adjustable aperture size, the focusing distance extending between a center of the Mantel optic and a surface of the detector, resulting in a sample-to-detector distance included between about 55 mm and about 155 mm; and outputting an X-ray diffraction pattern.

90. A transmission X-ray diffraction (XRD) apparatus, the transmission XRD apparatus comprising:

an X-ray source for irradiating a sample with an X-ray beam;

a detector for receiving X-rays transmitted through the sample and outputting an X-ray diffraction pattern therefrom;

an optical element positioned between the X-ray source and the detector, the optical element comprising a Montel optic and a secondary pin-hole collimator collectively adapted to focus the X-ray beam on the detector; and a motorized stage, comprising:

a base;

a sample holder for receiving the sample, the sample holder being mounted to the base, such that the sample is positioned to receive the X-ray beam when held by the sample holder; and a motor assembly in driving engagement with the sample holder, the motor assembly being configured to impart a relative movement to the sample with respect to the X-ray source and the detector.

The invention claimed is:

1. A transmission X-ray diffraction (XRD) apparatus, the transmission XRD apparatus comprising:

an X-ray source for generating a direct X-ray beam;

a sample holder for receiving the sample, the sample being positioned to receive the direct X-ray beam when held by the sample holder;

a detector for receiving X-rays transmitted through the sample and outputting an X-ray diffraction pattern therefrom; and an optical element positioned between the X-ray source and the detector, the optical element comprising a Montel optic and a secondary pin-hole collimator collectively adapted to focus the direct X-ray beam on the detector, wherein a ratio between a dimension of the direct X-ray beam projected on the detector and a sample-to-detector distance is equal or smaller than 1/570 and a ratio between a largest diagonal dimension of the detector and the sample-to-detector distance is greater than 1.

2. The transmission XRD apparatus of claim 1, wherein the detector is a solid-state detector.

3. The transmission XRD apparatus of claim 2, wherein the solid-state detector is a Si-based detector.

4. The transmission XRD apparatus of claim 1, wherein the X-ray beam transmitted through the sample has a focus beam size of about 183 microns by about 156 microns at the surface of the detector.

5. The transmission XRD apparatus of claim 1, wherein the detector is configured to have an angular coverage of at least 45°-2θ.

6. The transmission XRD apparatus of claim 5, wherein the angular coverage is about 55°-2θ.

7. The transmission XRD apparatus of claim 5, wherein the detector has a detector pixel size of about 75 microns by 75 microns.

8. The transmission XRD apparatus of claim 5, wherein the detector has an active area of about 77 mm by about 79 mm.

9. The transmission XRD apparatus of claim 5, wherein a ratio between the angular range and a convergence angle of the X-rays transmitted through the sample is greater than 150.

10. The transmission XRD apparatus of claim 1, wherein the X-ray source is operable in a vertical configuration with respect to the sample holder.

11. The transmission XRD apparatus of claim 10, wherein the sample holder is a well plate with a solid or a porous bottom support.

12. The transmission XRD apparatus of claim 1, wherein the X-ray source is operable in a configuration approximately or completely horizontal with respect to the sample holder.

13. The transmission XRD apparatus of claim 12, wherein the sample holder is a capillary cell.

14. The transmission XRD apparatus of claim 13, further comprising a temperature controller, the temperature controller being configured to heat or cool the capillary cell.

15. The transmission XRD apparatus of claim 13, further comprising an environmental module, the environmental module being configured to control at least one environmental condition of the capillary cell.

16. The transmission XRD apparatus of claim 15, wherein said at least one environmental condition comprises humidity and/or gas pressure.

17. The transmission XRD apparatus of claim 1, wherein the detector is configured to be positioned at any angular position between 0°-2θ to 130°-2θ.

18. The transmission XRD apparatus of claim 1, further comprising a camera and a laser focusing system mounted near or on the optical element.

19. A method for characterizing a sample, the method comprising:

generating a direct X-ray beam with an X-ray source, the direct X-ray beam being transmitted through the sample before being collected by a detector;

conditioning the direct X-ray beam with an optical element positioned between the X-ray source and the detector, the optical element comprising a Montel optic and a secondary pin-hole collimator collectively adapted to focus the direct X-ray beam on the detector, wherein a ratio between a dimension of the direct X-ray beam projected on the detector and a sample-to-detector distance is equal or smaller than 1/570 and a ratio between a largest diagonal dimension of the detector and the sample-to-detector distance is greater than 1; and outputting an X-ray diffraction pattern.

20. A transmission X-ray diffraction (XRD) apparatus, the transmission XRD apparatus comprising:

an X-ray source for irradiating a sample with an X-ray beam;

a detector for receiving X-rays transmitted through the sample and outputting an X-ray diffraction pattern therefrom;

an optical element positioned between the X-ray source and the detector, the optical element comprising a Montel optic and a secondary pin-hole collimator collectively adapted to focus the X-ray beam on the detector, wherein a ratio between a largest diagonal dimension of the detector and a sample-to-detector distance is greater than 1; and a motorized stage, comprising:

a base;

a goniometer head supported by the base;

a sample holder for receiving the sample, the sample holder being mounted to the goniometer head, such that the sample is positioned to receive the X-ray beam when held by the sample holder; and a motor assembly in driving engagement with the goniometer head, the motor assembly being configured to impart a relative movement to the sample with respect to the X-ray source and the detector.

21. The transmission X-ray diffraction (XRD) apparatus of claim 20, wherein a ratio between a dimension of a direct X-ray beam projected on the detector and a sample-to-detector distance is equal or smaller than 1/570.

22. The transmission XRD apparatus of claim 20, wherein the motorized stage is configured to provide the sample with an oscillation movement during data collection.

* * * * *